Patented May 4, 1943

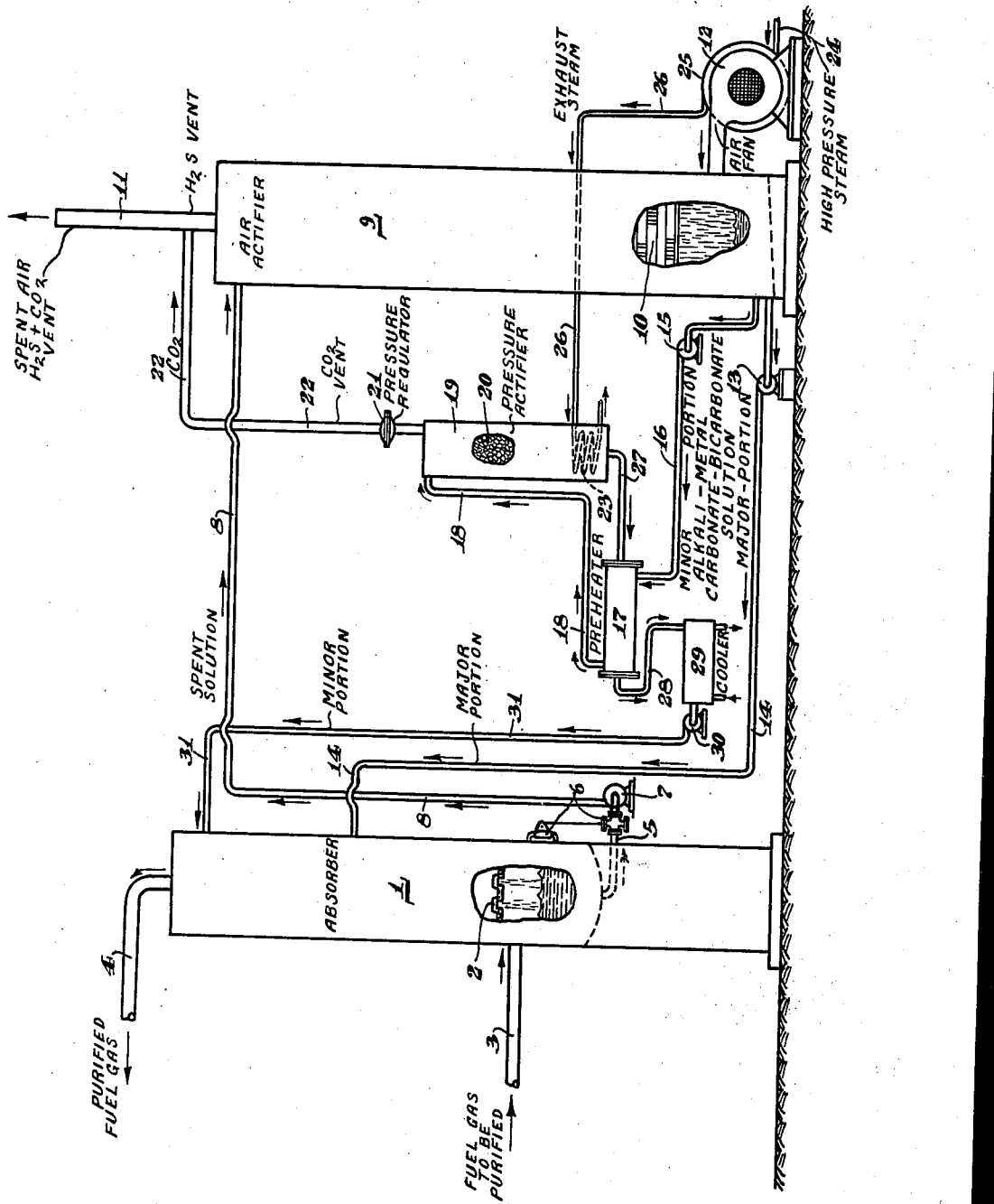

2,318,523

UNITED STATES PATENT OFFICE 2,318,523

SEPARATION AND PURIFICATION CF GASEOUS MIXTURES

Alfred R. Powell, Pittsburgh, Pa., assignor to Koppers Company, a corporation of Delaware Application January 15, 1941, Serial No. 374,430

5 Claims. (Cl. 23—3)

The present invention relates to an improved cyclic process for continuously removing hydrogen sulphide from gaseous mixtures also containing variable and relatively large quantities of carbon dioxide.

In Jacobson U. S. Patent 1,390,037, that issued September 6, 1921, to the Koppers Company, there is set forth a method for purifying gases of hydrogen sulphide by recycling an alkali-metal carbonate solution in series respectively through absorption and actification steps. This method is principally directed towards the purification of fuel gases, such as coke-oven gas. These gases normally have low carbon dioxide contents of about 1 per cent to 2.5 per cent. In the actification step, spent solution from the absorption step is brought into contact with a current of air which carries out absorbed hydrogen sulphide present in the solution, the same being liberated in consequence of the reversible reaction, i. e., $NaHS + NaHCO_3 \rightleftharpoons Na_2CO_3 + H_2S$, the current of air serving to displace the reaction to the right and thereby upsetting the equilibrium.

The process of said patent which is well known as the so-called Seaboard process is primarily directed to the removal of hydrogen sulphide from gaseous mixtures and substantially only this constituent is removed in the actification step for spent solution. With significant increase in the carbon dioxide content of the gaseous mixtures, the bicarbonate formed in the absorption step builds up inordinately and the hydrogen sulphide absorption capacity is greatly reduced because in the aeration procedure for actification relatively little carbon dioxide is removed from the recycled solution. The Seaboard process is operative on gases of lower carbon dioxide content because, when equilibrium has been established between the bicarbonate of the scrubbing solution and the carbon dioxide of the gas being treated there still remains sufficient of the carbonate present in the scrubbing solution to give efficient hydrogen sulphide removal in the absorption step. The Seaboard process has many advantages because of its simple and economical operation. It is highly desirable that it be adapted for use in purifying gases containing higher percentages of carbon dioxide.

In the co-pending application PSPV of Powell, S/N 347,131, filed July 24, 1940, there is set forth a method of regulating, in alkali-metal carbonate scrubbing solutions cyclicly employed for removing hydrogen sulphide from gases, the carbonate to bicarbonate ratio for the purpose of maintaining a preferred dynamic equilibrium and hydrogen sulphide absorption efficiency of the solution regardless of the carbon dioxide content of the to-be-purified gases. The present application is a continuation in part of the said Powell application.

An object of the present invention is to provide an improved actification step for the Seaboard process in which not only hydrogen sulphide is removed but also more strongly acidic gases, such as carbon dioxide.

A further object of the present invention is to provide means whereby the well-known Seaboard process for extracting hydrogen sulphide from gaseous mixtures becomes of improved utility when employed for gases containing varying quantities of carbon dioxide or such higher contents thereof that the scrubbing solution would be otherwise rapidly depleted of its hydrogen sulphide absorption capacity.

A further object of the present invention is to provide means whereby the bulk of the hydrogen sulphide present in spent alkali-metal carbonate solutions from gas purification processes can be removed by the economical aeration method and the bicarbonate content thereof be independently regulated.

A further object is to provide an improved method for actifying spent solution from the Seaboard process whereby the amount of reagent present therein in the form of the carbonate itself can be maintained at an optionally regulable level.

A further object of the present invention is to provide means for regulating not only the hydrogen sulphide content but also the carbon dioxide content of the recycled scrubbing solution.

The invention has for further objects such other improvements and such other operative advantages or results as may be found to obtain in the process or apparatus hereinafter described or claimed.

According to the present invention spent solutions from an absorption step for removing both hydrogen sulphide and carbon dioxide from gaseous mixtures are actified in two stages, first in an aeration stage and subsequently by boiling.

As above mentioned, the Seaboard process comprises essentially an absorption step for the removal of hydrogen sulphide from a mixture containing the same followed by an actification step wherein spent scrubbing solution is aerated by being passed downwardly counter-current to an updraft of air thereby to remove the absorbed hydrogen sulphide. In the present improvement some of the so-aerated solution is continuously flowed to a further treating step wherein it is subjected to heating under conditions for removing a regulated amount of carbon dioxide therefrom, that is, preferably that amount of carbon dioxide absorbed in the absorption step and which it is necessary to remove to maintain the scrubbing solution at a preferred absorption efficiency. That part of the solution actified only by aeration is preferably returned to the absorption step independently of that portion of the solution actified by aeration and heat, the latter being returned to said absorption step at a point therein subsequent to that at which the air-actified solution is introduced. Such point of introduction for the solution portion actified by aeration and heat is advantageous because with its higher alkali-metal carbonate content it can more effectively remove small traces of hydrogen sulphide in the gas leaving contact with the bulk of the solution that has been actified only by aeration.

In the accompanying drawing forming a part of this specification and showing for purposes of exemplification a preferred apparatus and method in which the invention may be embodied and practiced but without limiting the claimed invention specifically to such illustrative instance or instances:

The single figure is a diagrammatic representation in elevation, with parts broken away, of apparatus for carrying out the improved gas purification process of the present invention.

In the apparatus shown in the figure the purification of the gas takes place in absorber 1. While various types of gas and liquid contact apparatus may be employed, that of the well-known bell-and-tray type 2 is shown. The gas to be purified enters absorber 1 through pipe 3 located near the bottom thereof and passes upwardly in counter-current to a descending flow of a sodium carbonate-bicarbonate solution having absorbent properties with respect to hydrogen sulphide and carbon dioxide, the major portion of said solution being introduced into the absorber through line 14. It is to be understood that wherever the sodium salt is mentioned the potassium salt is equally effective. In this primary absorption step the bulk of the hydrogen sulphide and some carbon dioxide are removed from the gas which thereafter continues to pass upwardly through said absorber into counter-current contact with a descending flow of a minor amount of scrubbing solution containing a higher percentage of the sodium carbonate or a proportionately higher carbonate to bicarbonate ratio than the bulk of the scrubbing solution introduced through line 14, said minor solution portion being introduced at or near the top of absorber 1 through line 31. In this secondary absorption step, the minor solution portion, having a greater absorptive capacity for hydrogen sulphide, is especially adapted to remove hydrogen sulphide from the traces thereof still remaining in the gas. The proportions of the recycled solution introduced through lines 14 and 31 and the carbonate to bicarbonate ratio of the solution introduced through the latter are easily controllable by means later indicated to give the preferred results. The so-purified gas then passes from the absorber through line 4.

For actification of the commingled solutions employed in absorber 1 there is provided apparatus which may be of the same type of construction as said absorber, however the air-actifier apparatus 9 is shown with hurdle-construction packing 10.

The spent solution reaching the bottom of absorber 1 is an admixture of the solutions originally admitted to said absorber through lines 14 and 31 as previously described. It passes from the absorber through line 5, thereafter through the valve of liquid-level regulator 6 to pump 7 which sends it through line 8 to air-actifier 9. The spent solution passes downwardly through the actifier 9 in counter-current to a rising flow of air introduced at the bottom thereof by air-fan 12, the spent solution being thereby aerated for the liberation of substantially all of the hydrogen sulphide which leaves actifier 9 admixed with the employed air through vent 11.

The major portion of the solution that is now regenerated in respect of hydrogen sulphide, is drawn from the bottom of actifier 9 by pump 13 which sends it through line 14 whereby it is returned to absorber 1. Thereafter said solution continues the cycle of absorption and actification by flowing downwardly in counter-current contact with further quantities of the to-be-purified gas.

A minor portion of the aerated solution in the form of a sidestream, is preferably continuously withdrawn from the bottom of actifier 9 by pump 15 which sends it through line 16 to heat exchanger 17, for preliminary heating by indirect contact with hotter solutions from a subsequent step in the process, the so-heated solution being thereafter flowed through line 18 to the top of pressure actifier 19.

Pressure actifier 19 can be any type of vapor-and-liquid contact apparatus such as one built up of bubble-cap trays or a tower packed with hurdles, spirals, Raschig rings, or the like, and is here shown as a coke-packed tower 20 equipped with a pressure regulator 21 and vent 22 connecting with air-actifier vent 11. Air-fan 12 is preferably driven by a steam turbine 25 with high pressure steam supplied through line 24, the exhaust steam from said turbine being flowed through line 26 and heating coil 23 located at or near the bottom of pressure actifier 19 for purposes of utilizing the heat in said exhaust steam from the high pressure steam, which has been employed to drive the air fan, to boil the descending solution in $CO_2$ pressure actifier 19 for the removal of carbon dioxide from said solution.

The small sidestream of $CO_2$ air-regenerated solution introduced at the top of pressure actifier 19 through line 18, as previously described, passes down through said pressure actifier counter-current to a rising flow of steam. The volume of said sidestream and the conditions under which it is treated are so chosen that the amount of carbon dioxide here liberated preferably represents that previously absorbed in one traversing of the absorber, thereby to continuously maintain its capacity to absorb hydrogen sulphide at the preferred level. The required pressure at which the solution is boiled to liberate preferred quantities of carbon dioxide and incidental quantities of hydrogen sulphide is determined empirically and may vary from atmospheric pressure to three or four atmospheres, said pressure being produced by the heat of indirect turbine exhaust steam in coil 23, which heat generates steam from the solution itself, said generated pressure being maintained at the preferred level by pressure regulator 21.

The preferred quantity of indirect heat obtained from coil 23 is brought into contact with the downflowing solution in the $CO_2$ pressure actifier 19, as previously described, thereby boiling said solution to expel residual quantities of hydrogen sulphide but serving mainly to liberate the preferred quantity of carbon dioxide with an equivalent conversion of sodium bicarbonate to carbonate, thus increasing the sodium carbonate to bicarbonate ratio of this portion of the solution to the required point above that obtaining in the bulk of the air-regenerated solution. The current of steam carrying carbon dioxide and some hydrogen sulphide from the top of pressure actifier 19 leaves through pressure-regulator 21 and is expelled through vent lines 22 and 11. With its capacity for the further absorption of hydrogen sulphide greatly increased, the pressure regenerated solution is withdrawn from the bottom of actifier 19 through line 27 to heat exchanger 17 where by indirect contact it gives up its heat to the incoming to-be-treated air-actified solution, thereafter flowing from said heat exchanger through line 28 to solution cooler 29 where it is cooled to the preferred temperature by indirect contact with water and thence returned by pump 30 through line 31 to the top of absorber 1 where it continues through the cycle of operation by first serving to absorb hydrogen sulphide from the traces thereof in the gas about to leave the absorber.

The following comparative data derived from a specific application of the present improvement are illustrative of the advantages and results realizable by its employment in the separation and purification of gaseous mixtures:

A stream of fuel gas that under standard conditions of temperature and pressure showed a content of 1.5 per cent of carbon dioxide and 500 grains of hydrogen sulphide per 100 cubic feet was continuously scrubbed under the said standard conditions of temperature and pressure, at the rate of about 60 gallons per M cubic feet, with an aqueous solution having an alkalinity of approximately 30 g. p. l. expressed as sodium carbonate, 0.7 of such sodium present being in the form of $NaHCO_3$ and the remainder thereof in the form of $Na_2CO_3$. The hydrogen-sulphide content of the scrubbed gas that issued from the absorber was 25 grains per 100 cubic feet which represents a removal of 95 per cent of that constituent. Spent scrubbing solution from the absorbent step was continuously aerated countercurrently with a volume of air substantially three times that of the gas being treated and thereafter returned to the absorption step. The process operated satisfactorily for a protracted period and without important change in the stated bicarbonate-carbonate ratio.

An alkaline scrubbing solution having the above-given analysis was similarly employed to treat for the removal of hydrogen sulphide a stream of fuel gas that under standard conditions of temperature and pressure showed the same content of hydrogen sulphide but also contained 5 per cent by volume of carbon dioxide. This latter fuel gas was scrubbed at a gauge pressure of 60 pounds per square inch while employing said alkaline solution at a rate of approximately 210 gallons per M cubic feet of the compressed gas. In a short time the sodium bicarbonate content of the scrubbing solution rose from a point where it represented 0.7 of the sodium present in the solution to an amount equalling 0.965 thereof, thus leaving only 0.035 of the sodium present in the form of the carbonate. The removal of hydrogen sulphide rapidly decreased and the capacity of the aerated solution to absorb the same became so depleted that a satisfactory removal of hydrogen sulphide could only be obtained by the recirculation of such large quantities of the solution as made its further employment economically prohibitive.

According to the present improvement, spent scrubbing solution from the above-described absorption step for hydrogen sulphide from the fuel gas containing 5 per cent by volume of carbon dioxide was first continuously passed through an aeration stage of actification where absorbed hydrogen sulphide was removed and thereafter about 25 per cent of the volume thereof, or at a rate of 52.5 gallons per M cubic feet of gas being treated, was continuously boiled to remove carbon dioxide and the sodium bicarbonate content therein thus reduced to 0.3 of the total sodium combined in the form of the carbonate and bicarbonate. The so-treated solution-fraction was continuously returned to the absorption step along with the air-actified solution-portion. The hydrogen-sulphide content of the purified gas issuing from the absorption step was maintained at substantially 5 grains per 100 cubic feet regardless of its initially high carbon-dioxide content.

It is now possible, simply and economically to effect in a continuous process the removal of hydrogen sulphide from industrial gases also carrying large quantities of carbon dioxide, by combining the simplicity of operation of the well-known Seaboard process for the removal of hydrogen sulphide with an improved and controllable flexibility in the solution system by the removal of preferred quantities of carbon dioxide from the recycled solution thereby continuously maintaining a high absorption efficiency in said recycled solution. The present improved process can be practiced where the to-be-purified gases are at, above or below atmospheric pressure.

The invention as hereinabove set forth is embodied in particular form and manner but may be variously embodied within the scope of the claims hereinafter made.

I claim:

1. In a system for recovering hydrogen sulphide, the steps of continuously passing a solution of mixed alkali-metal carbonate and bicarbonate into $H_2S$ absorption contact with gases containing $H_2S$ and such quantities of carbon dioxide that carbonates of the solution are converted to bicarbonates to such an extent that the solution capacity for renewed absorption of $H_2S$ is depleted after removal of the previously absorbed $H_2S$; subjecting the entire bulk of solution from the absorption step to a stage of continuous regeneration by countercurrent aeration with air so as to expel substantially only the absorbed $H_2S$; and thereafter, in a second stage of regeneration, continuously heating under elevated pressure such a minor proportion of the so aerated solution to remove $CO_2$ from bicarbonate therein, and so as to increase the ratio of carbonate to bicarbonate in the minor portion to such an extent above that ratio required in the bulk for renewed absorption of $H_2S$, that the mere commingling of the minor portion with the remainder of aerated solution will restore in the bulk the required ratio of carbonate to bicarbonate for renewed absorption of further $H_2S$ from gas as aforesaid; and continuously recommingling the regenerated solutions from both stages in proportion to re-establish the required carbonate to bicarbonate ratio in the entire bulk of solution, and renewing the absorption of H2S from gas as aforesaid therewith.

2. In a system for recovering hydrogen sulphide, the steps of continuously passing a solution of mixed sodium carbonate and bicarbonate into H2S absorption contact with gases containing H2S and such quantities of carbon dioxide that carbonates of the solution are converted to bicarbonates to such an extent that the solution capacity for renewed absorption of H2S is depleted after removal of the previously absorbed H2S; subjecting the entire bulk of solution from the absorption step to a stage of continuous regeneration by countercurrent aeration with air, and so as to expel substantially only the absorbed H2S; and thereafter, in a second stage of regeneration, continuously heating under elevated pressure such a minor proportion of the so aerated solution to remove CO2 from bicarbonate therein so as to increase the ratio of carbonate to bicarbonate in the minor portion to such an extent above that ratio required in the bulk for renewed absorption of H2S, that the mere commingling of the minor portion with the remainder of aerated solution will restore in the bulk the required ratio of carbonate to bicarbonate for renewed absorption of further H2S from gas as aforesaid; and continuously recommingling the regenerated solutions from both stages in proportion to reestablish the required carbonate to bicarbonate ratio in the entire bulk of solution, and renewing the absorption of H2S from gas as aforesaid therewith.

3. In a system for recovering hydrogen sulphide by means of a solution of mixed alkali-metal carbonate and bicarbonate from gases containing such quantities of carbon dioxide as will convert carbonates of the solution to bicarbonates to such an extent that the solution capacity for renewed H2S absorption to the same extent is depleted after removal of the previously absorbed H2S, the steps comprising: continuously flowing the entire bulk of the converted solution aforesaid through an aeration actification step and aerating the entire bulk therein by countercurrent flow of air induced by a driven fan to liberate substantially only the absorbed H2S; continuously flowing a minor portion of the so aerated solution through a further actification step and boiling it at elevated pressure to remove carbon dioxide from bicarbonate therein; regulating the volume treated as the minor portion and the amount of carbon dioxide driven off therefrom so that the amount of carbon dioxide driven off from the minor portion represents substantially the amount of carbon dioxide previously absorbed from the gas by the entire bulk of the solution; inducing the flow of air in the aeration actification step by flowing high pressure steam through a driving means to operate said air fan, and in amount to maintain the flow of air required in aeration of the total bulk of solution; flowing the effluent steam from the driving means into indirect contact with the solution in said further actification step and effecting the boiling of the minor solution-portion and driving off of the carbon dioxide therefrom with the residual heat of the effluent steam; continuously removing the H2S and CO2 liberated in both actification steps from the process after their traversal of the respective actification steps; continuously commingling solution from both actification steps in proportion to re-establish the required carbonate to bicarbonate ratio in the bulk for renewed H2S absorption of gas aforesaid; and continuously flowing the so commingled solution over gas as aforesaid in the absorption step of the process for renewed gas purification therein.

4. In a process comprising a gaseous absorption step and a spent-solution regeneration step for removing H2S from gas by means of a solution of alkali-metal carbonate-bicarbonate, the steps comprising: in the regeneration step, heating a minor portion only of the bulk of the fouled alkali-metal carbonate-bicarbonate solution, and merely aerating the rest of the bulk of the fouled solution by countercurrent flow of aeration air; removing by said aeration the bulk of the hydrogen sulphide absorbed by the bulk of the solution, before returning the solution into contact with the gas in the absorption step; removing from said minor solution portion, by said heating, a quantity of CO2 which will deplete its bicarbonate content to such an extent below the predetermined level for bicarbonates in the whole solution for H2S absorption, and so regulating the amount of the portion activated as the minor portion, that the commingling of the minor portion with the merely aerated residual major portion will restore to the bulk the ratio of carbonate to bicarbonate required for renewed absorption of H2S; and thereafter commingling the so activated minor portion and the merely aerated portion; and purifying gas aforesaid therewith in the absorption step.

5. In the method of purifying a gas from hydrogen sulphide and carbon dioxide which comprises the recirculation of a regenerable absorbent solution of alkali-metal carbonate and bicarbonate through a cycle comprising an absorption stage in which the solution is brought into contact with the gas, and a regeneration stage in which the solution is regenerated, the improvement which consists in: washing the gas with a flow of absorbent liquid in a primary absorption stage to remove the bulk of its hydrogen sulphide content and with another flow of absorbent liquid in a secondary stage for removal of small traces of hydrogen sulphide left over in the gas from the primary stage; commingling the liquid from the secondary stage with the aforesaid flow of liquid in the primary stage; regenerating the fouled commingled solution from the primary stage by passing the entire bulk through an actification stage in countercurrent relation with a flow of air to remove the bulk of its absorbed H2S while leaving the solution depleted in its carbonate content to a level below that required for renewed H2S absorption; recirculating the major portion of the bulk of said depleted solution over the gas in said primary absorption stage; boiling such a proportionate minor portion of the bulk of the so depleted solution under pressure so as to remove CO2 from bicarbonate to such an extent as to increase its carbonate to bicarbonate ratio to an amount in excess of the ratio required in the bulk of the solution for H2S absorption in the primary absorption stage that the commingling of the minor portion, after its traversal of the secondary absorption stage, with the depleted major portion in the primary absorption stage, will restore in the entire bulk the ratio of carbonate to bicarbonate required for absorption of the bulk of the hydrogen sulphide content of the gas in the primary absorption stage; and recirculating the so boiled minor portion over the gas in said secondary stage.

ALFRED R. POWELL.